(12) United States Patent
Hiraguchi

(10) Patent No.: US 6,974,102 B2
(45) Date of Patent: Dec. 13, 2005

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 91 days.

(21) Appl. No.: 10/642,651

(22) Filed: Aug. 19, 2003

(65) Prior Publication Data

US 2004/0041049 A1    Mar. 4, 2004

(30) Foreign Application Priority Data

Aug. 30, 2002  (JP) .............................. 2002-255101

(51) Int. Cl.$^7$ .......................................... G11B 23/107
(52) U.S. Cl. .................................. 242/348.2; 360/132
(58) Field of Search ............................ 242/338, 338.1, 242/338.2, 338.4, 348, 348.2, 332.4; 360/132

(56) References Cited

U.S. PATENT DOCUMENTS

| | | | | |
|---|---|---|---|---|
| 4,452,406 A | * | 6/1984 | Richard .................... | 242/348.2 |
| 4,775,115 A | * | 10/1988 | Gelardi .................... | 242/348.2 |
| 5,868,338 A | * | 2/1999 | Martin et al. ............... | 242/348 |
| 6,452,747 B1 | * | 9/2002 | Johnson et al. ............. | 360/132 |
| 6,525,907 B1 | | 2/2003 | Takahashi et al. | |
| 6,739,539 B2 | * | 5/2004 | Hiraguchi et al. ........ | 242/348.2 |
| 6,742,738 B2 | * | 6/2004 | Hiraguchi ................... | 242/338 |

* cited by examiner

Primary Examiner—William A. Rivera
(74) Attorney, Agent, or Firm—Sughrue Mion, PLLC

(57) ABSTRACT

A recording tape cartridge in which, even if impact is applied to a vicinity of an opening of a case due to a drop or the like, a leader pin does not fall out from pin holding portions. The recording tape cartridge has a case which is substantially rectangular, and at which an upper case and a lower case formed of synthetic resin are joined together with peripheral walls thereof abutting one another, and which rotatably accommodates a single reel on which a recording tape is wound; an opening, formed at a corner portion of the case at a side of loading the case into a drive device, for pulling-out of a leader pin attached to an end portion of the recording tape; and pin holding portions formed at an inner surface of the upper case and an inner surface of the lower case, and holding the leader pin in a vicinity of the opening. A draft of a ridge line portion of the case in a vicinity of the opening is 1° or less.

17 Claims, 10 Drawing Sheets

RECORDING TAPE CARTRIDGE

CROSS-REFERENCE TO RELATED APPLICATION

This application claims priority under 35USC 119 from Japanese Patent Application No.2002-255101, the disclosure of which is incorporated by reference herein.

BACKGROUND OF THE INVENTION

1. Field of the Invention

The present invention relates to a recording tape cartridge accommodating, within a case, a single reel on which is wound a recording tape, such as a magnetic tape or the like, which is used as a recording/playback medium mainly of computers or the like.

2. Description of the Related Art

Conventionally, magnetic tape cartridges have been known in which a magnetic tape, which is used as a data recording/playback medium of a computer or the like, is wound on a single reel, and the reel is accommodated in a case. A leader member, such as a leader pin, a leader tape, or a leader block, is provided at the distal end of the magnetic tape. A pull-out means provided at a drive device pulls the leader member out from an opening of the magnetic tape cartridge, and winds the magnetic tape, which is fixed to the leader member, onto a take-up reel of the drive device.

A reel gear is formed in an annular form in the center of the bottom surface of a reel which emerges from an open hole formed in the bottom surface of the magnetic tape cartridge. Due to a driving gear, which is provided at a rotating shaft of the drive device, meshing with this reel gear, the reel is driven to rotate. By rotating the reel of the magnetic tape cartridge and the take-up reel of the drive device synchronously, data can be recorded onto the magnetic tape, and data recorded on the magnetic tape can be played back.

A large amount of data can be recorded in the magnetic tape cartridge. The case of the magnetic tape cartridge is formed in a substantially rectangular form in which peripheral walls of an upper case and a lower case, which are made of a synthetic resin, are joined together by welding, screws, or the like. Little space is required for storage of the magnetic tape cartridge. Further, as shown in FIG. 9, drafts for facilitating removal from molds for molding are formed at peripheral walls 66A, 68A of an upper case 66 and a lower case 68. This draft β is usually about 1° to 2° as seen in the side sectional view of FIG. 9. In this way, the upper case 66 and the lower case 68, which are molded products, can be smoothly removed from the molds for molding thereof.

Moreover, in such a magnetic tape cartridge, the position of the opening differs for each type of leader member. For example, in a case in which a leader pin is used, the opening is formed at a corner portion at the side of loading the magnetic tape cartridge into a drive device. A pair of upper and lower pin holding portions, which hold the leader pin in an upright state when the magnetic tape cartridge is not being used (is being stored or the like), are provided at the inner surface of the ceiling plate of the upper case and the inner surface of the floor plate of the lower case in a vicinity of the opening. The pin holding portions are formed in substantially semicylindrical shapes as seen in plan view, and respective one portions thereof are open so that the leader pin can enter therein and exit therefrom. As shown in FIG. 10A, both end portions 60A of the leader pin 60, which is in a state of standing upright, are inserted and held in pin holding portions 62.

However, when the case is dropped and a peripheral wall at which a draft is formed in this way, and in particular, the peripheral wall at the side of loading into a drive device at which peripheral wall the opening is formed at the end portion thereof (i.e., the front wall) hits the ground, if the vicinity of opening is joined together by screws, as shown in FIG. 10B, a front wall 64 (the peripheral walls 66A, 68A) in a vicinity of the opening may flexurally deform so as to be pushed toward the inner side of the case, due to the impact of the drop. Accompanying this flexural deformation, a ceiling plate 66B of the upper case 66 and a floor plate 68B of the lower case 68 flexurally deform toward the outer sides.

When such flexural deformation arises, because the both end portions 60A of the leader pin 60 are held in the pin holding portions 62 which are formed at the inner surface of the ceiling plate of the upper case 66 and the inner surface of the floor plate of the lower case 68, the both end portions 60A of the leader pin 60 may fall out from the pin holding portions 62, or the positions thereof may become offset. At the time when the magnetic tape cartridge is loaded into a drive device, the problem that a pull-out means provided at the drive device cannot pull the leader pin 60 out may arise.

SUMMARY OF THE INVENTION

An object of the present invention is to provide a recording tape cartridge in which, even if impact is applied to a vicinity of an opening of a case due to a drop or the like, it is difficult for a leader pin to fall out from pin holding portions due to the impact.

In order to achieve the above-described object, in accordance with one aspect of the present invention, there is provided a tape cartridge which can be inserted into a tape drive having an opening member which can operatively engage with the tape cartridge at a time when the tape cartridge is inserted, the tape cartridge comprising: a case which is hollow, and which is formed of a synthetic resin, and which has an upper case and a lower case each formed from a base plate and a peripheral wall, and which is formed by the peripheral walls abutting one another, the case having a front wall portion facing in a cartridge insertion direction, a side wall portion substantially parallel to the cartridge insertion direction, and an inclined wall portion connecting the front wall portion and the side wall portion and inclined with respect to the cartridge insertion direction; a tape access opening provided at the inclined wall portion of the case; and a ridge line portion extending in a vertical direction and formed at an intersection of the front wall portion of the case and the inclined wall portion of the case, wherein a draft of the ridge line portion at the upper case and a draft of the ridge line portion at the lower case are both 1° or less.

In accordance with another aspect of the present invention, there is provided a tape drive into which a tape cartridge can be inserted, and which carries out at least one of reading of data and writing of data, the tape cartridge having: a case which is hollow, and which is formed of a synthetic resin, and which has an upper case and a lower case each formed from a base plate and a peripheral wall, and which is formed by the peripheral walls abutting one another, the case having a front wall portion facing in a cartridge insertion direction, a side wall portion substantially parallel to the cartridge insertion direction, and an inclined wall portion connecting the front wall portion and the side wall portion and inclined with respect to the cartridge insertion direction; a tape access opening provided at the inclined wall portion of the case; and a ridge line portion extending in a vertical direction and formed at an intersection of the front wall portion of the case and the inclined wall portion of the case, wherein a draft of the ridge line portion at the upper case and a draft of the ridge line portion at the lower case are both 1° or less, and the tape drive has an opening member which can operatively engage with the tape cartridge at a time when the tape cartridge is inserted.

DETAILED DESCRIPTION OF THE INVENTION

Hereinafter, a recording tape cartridge 10 relating to an embodiment of the present invention will be described on the basis of FIGS. 1 through 8B. First, the overall structure of the recording tape cartridge 10 will be briefly described, and then, main portions relating to the present invention will be described in detail. Note that, for convenience of explanation, the direction of loading the recording tape cartridge 10 into a drive device is denoted by arrow A, and this direction of arrow A is the forward direction (front side) of the recording tape cartridge 10. The direction of arrow B, which is orthogonal to the direction of arrow A, is the rightward direction.

Figure 1:
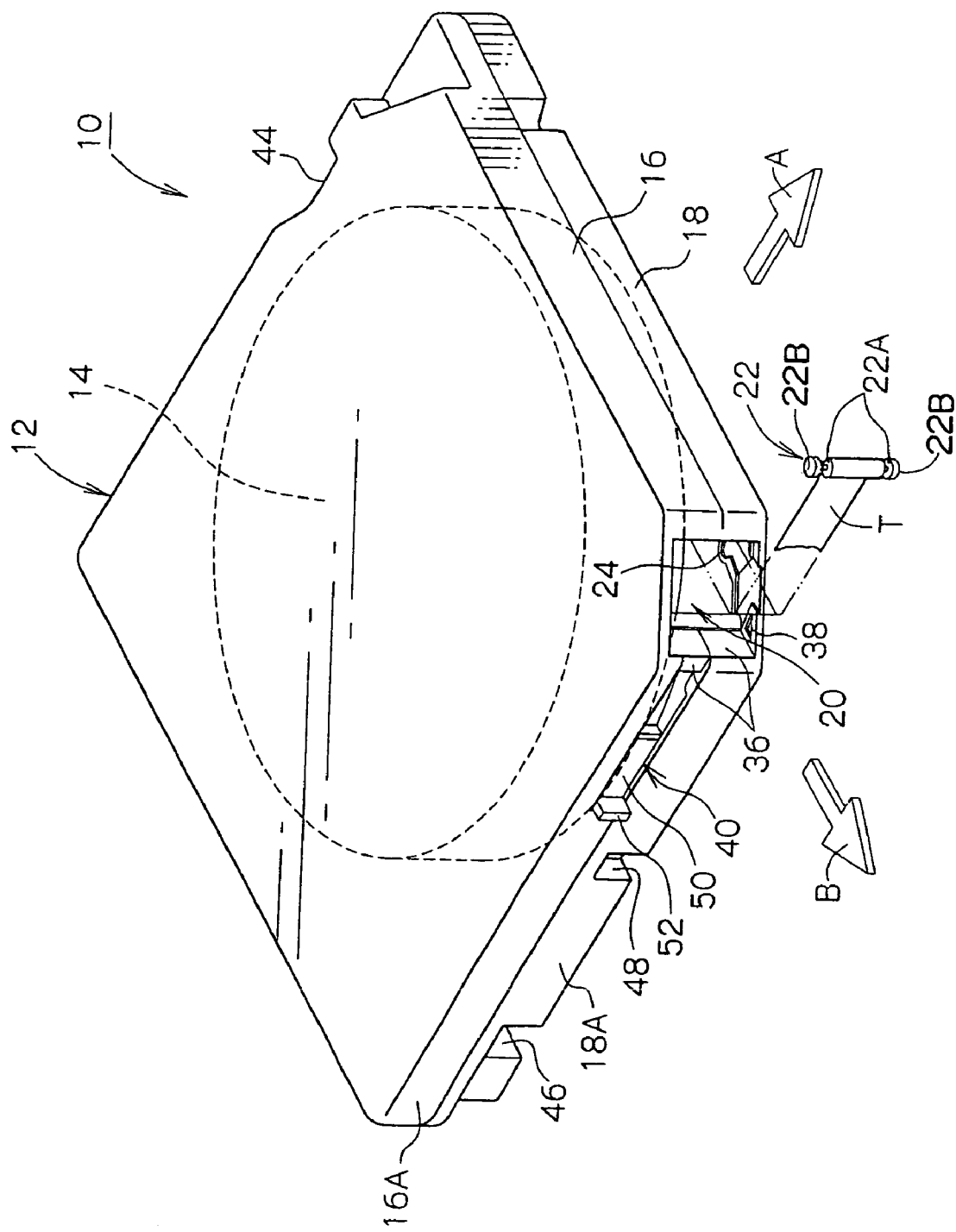
FIG. 1 is a schematic perspective view of a recording tape cartridge.
Figure 2:
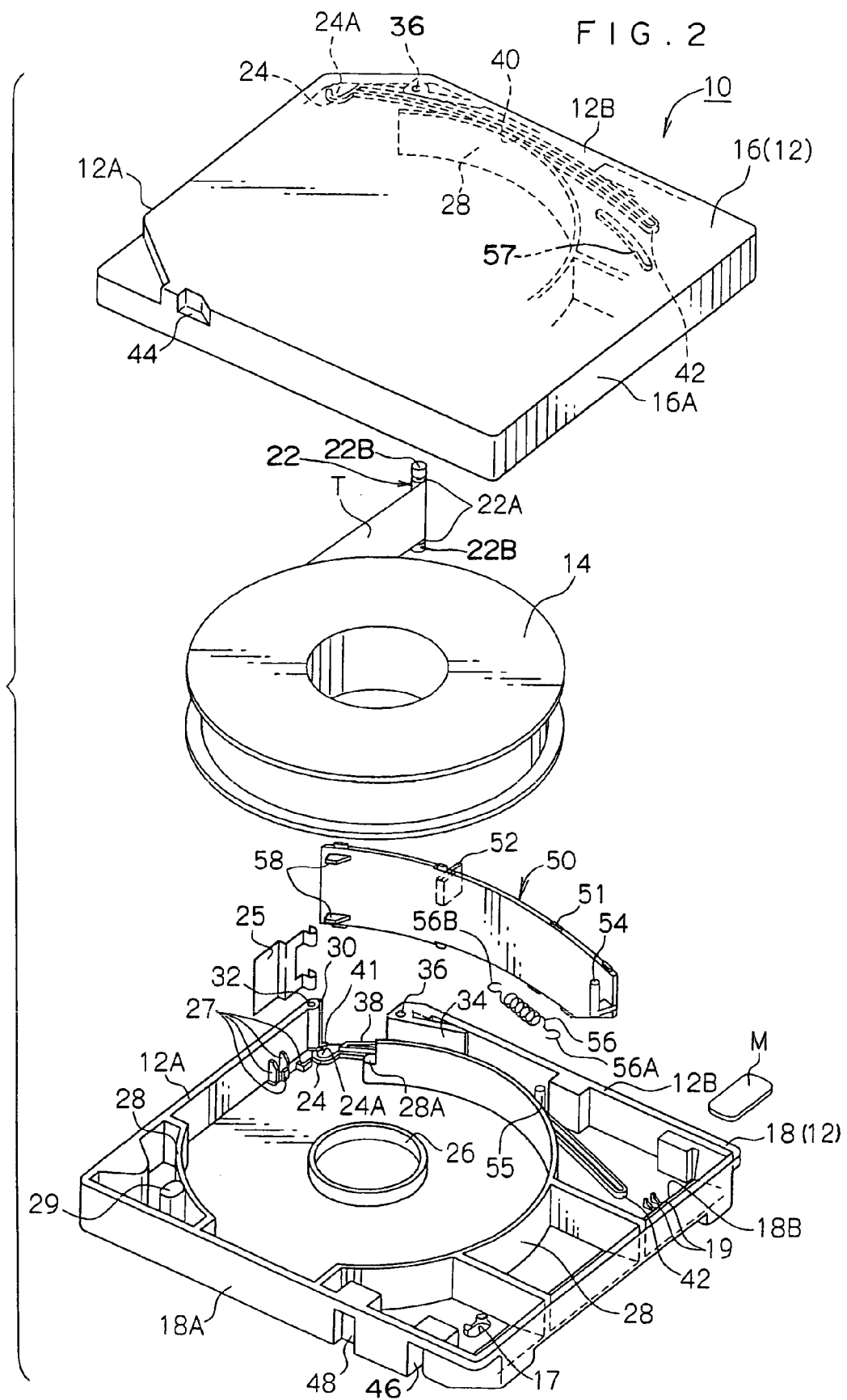
FIG. 2 is a schematic exploded perspective view of the recording tape cartridge.

As shown in FIGS. 1 and 2, the recording tape cartridge 10 is structured such that a single reel 14, on which is wound a magnetic tape T serving as a recording tape which is an information recording/playback medium, is rotatably accommodated within a case 12 which is formed of a synthetic resin and is substantially rectangular as seen in plan view. The case 12 is formed by joining together an upper case 16 and a lower case 18 with peripheral walls 16A, 18A thereof opposing (abutting) each other. The front right corner portion of each of the upper case 16 and the lower case 18, which is one corner portion at the leading side in the direction of loading the recording tape cartridge 10 into a drive device, is cut off at an incline as seen in plan view. A space for accommodating the reel 14, on which the magnetic tape T is wound, is provided at the interior of the case 12.

The corner portion of the upper case 16 and the lower case 18, at which corner portion the peripheral walls 16A, 18A have been cut off, forms an opening 20 which is for pulling-out of the magnetic tape T. A leader pin 22, which is pulled-out while being anchored (engaged) by a pull-out means of a drive device, is connected to the free end of the magnetic tape T which is pulled out from the opening 20. An annular groove 22A is formed in each of the end portions of the leader pin 22 which project out further than the transverse direction end portions of the magnetic tape T. The annular grooves 22A are anchored by hooks or the like of the pull-out means. In this way, the hooks or the like do not contact and scratch the magnetic tape T at the time of pulling-out the magnetic tape T.

Figure 3:
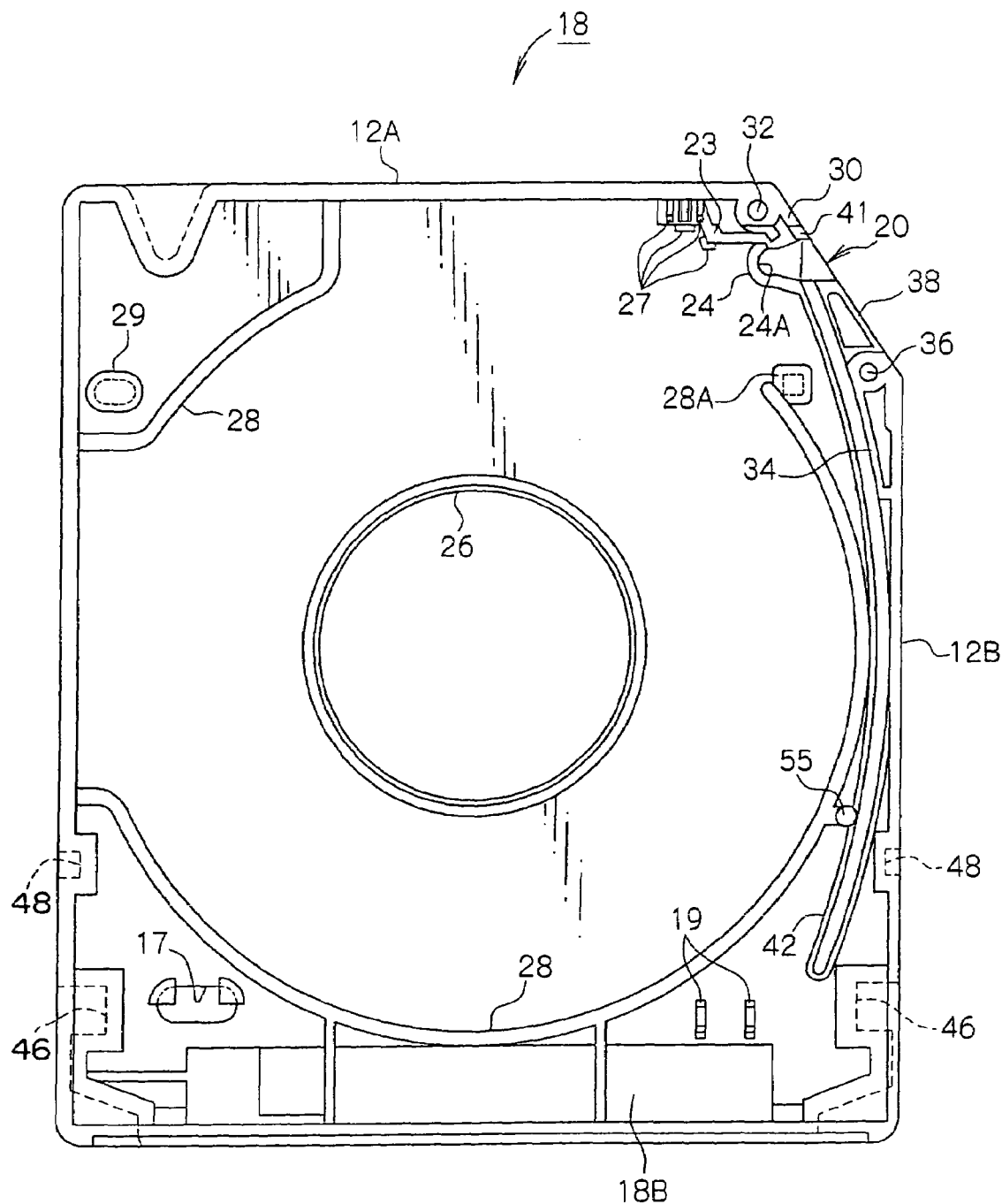
FIG. 3 is a schematic plan view of a lower case.
Figure 4:
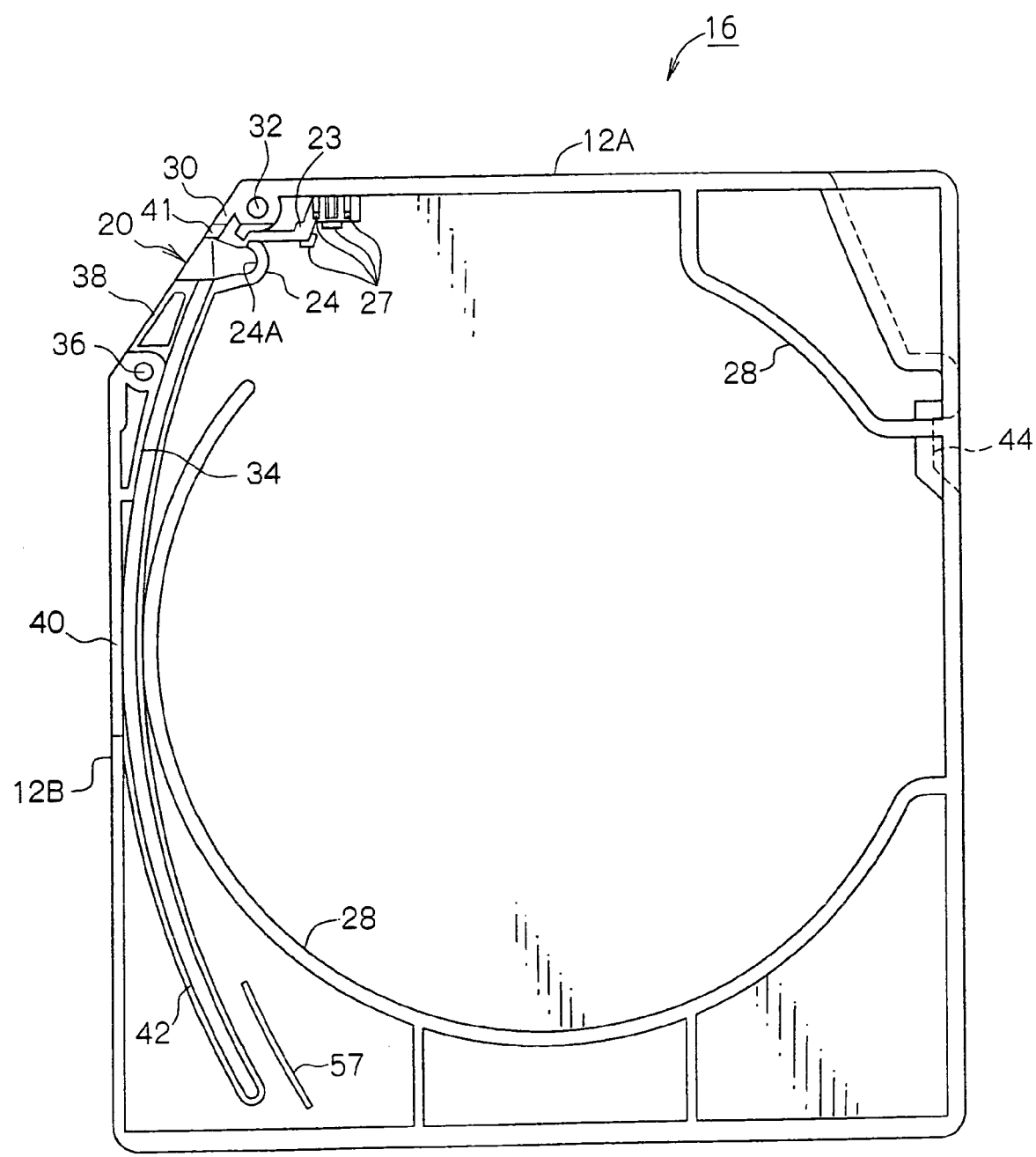
FIG. 4 is a schematic plan view of an upper case.

A pair of upper and lower pin holding portions 24, which position and hold the leader pin 22 within the case 12, are provided at the inner side of the opening 20 of the case 12, i.e., at the inner surface of the ceiling plate of the upper case 16 and at the inner surface of the floor plate of the lower case 18. As shown in FIGS. 3 and 4, the pin holding portions 24 are substantially semicylindrical, and the magnetic tape T pull-out sides thereof are open. The both end portions 22B of the leader pin 22, which is in a state of standing upright, are held so as to be able to enter in and exit from concave portions 24A of the pin holding portions 24 from these open sides.

A plate spring 25 is fixed in a vicinity of the pin holding portions 24 by the proximal portion of the plate spring 25 being inserted in spring holding portions 27 and groove portions 23 (see FIGS. 3 and 4) which are provided at the inner surface of a front wall 12A. (The front wall 12A is the portions of the peripheral walls 16A, 18A where the outer surfaces face in the direction of arrow A.) The distal end portions of the plate spring 25, which have been forked in two, engage with the upper and lower end portions 22B of the leader pin 22 and hold the leader pin 22 in the pin holding portions 24. At the time when the leader pin 22 enters into and exits from the pin holding portions 24, the distal end portions of the plate spring 25 elastically deform appropriately so as to permit movement of the leader pin 22.

Further, a gear opening 26, which is for exposing an unillustrated reel gear of the reel 14 to the exterior, is formed in the central portion of the lower case 18. The reel 14 is driven to rotate within the case 12 by the reel gear meshing with a driving gear of a drive device. Further, the reel 14 is held so as to not joggle by play restricting walls 28 which project out at portions of the inner surfaces of the upper case 16 and the lower case 18, and which serve as inner walls which are on a circular locus which is coaxial with the gear opening 26.

A bag portion 28A, in which a hole for position regulation is formed, is provided so as to be continuous with the end portion of the play restricting wall 28 in a vicinity of the opening 20. Further, a bag portion 29, in which is formed a hole for position regulation which is a long hole, is provided so as to be set apart from the play restricting wall 28 at the inner side of the front left corner portion of the case 12. The bag portions 28A, 29 are disposed on a single straight line which runs along the direction of arrow B. The end portions of the play restricting walls 28, except for the end portion thereof at which the bag portion 28A is continuous, are continuous with the peripheral wall 16A or the peripheral wall 18A of the case 12, so as to partition the outer sides of the play restricting walls 28 and the space at which the reel 14 is set.

A memory board M, which stores various types of information, is set at the rear right portion of the lower case 18 for each recording tape cartridge 10. A rear portion inner wall 18B is formed at an inclined surface of a predetermined angle and the memory board M is supported by supporting projections 19 so as to be inclined at a predetermined angle, such that sensing is possible at a drive device which reads from the bottom surface side and at a library device (a device which accommodates a plurality of the recording tape cartridges 10 and which automatically loads and removes the recording tape cartridges 10 into and from drive devices) which reads from the rear wall side.

An unillustrated write protect portion, which is set so that recording onto the recording tape cartridge 10 is possible or is not possible, is provided at the left rear portion of the lower case 18. An open hole 17, through which projects an operating projection (not illustrated) which operates the write protect portion, is formed in the left rear portion of the lower case 18.

A pair of top and bottom inclined wall portions 30, which are short and which prescribe the front edge portion of the opening 20, are provided at the right end portion of the front wall 12A of the case 12. The inclined wall portions 30 are bent along the plane of opening of the opening 20. The inclined wall portions 30 serve as dustproofing walls such that no gap through which dust or the like can enter arises, due to the distal end of a door 50, which is substantially arc-shaped in plan view and which will be described later, entering in at the inner side of the inclined wall portions 30 when the opening 20 is closed. Further, a pair of upper and lower screw bosses 32 are continuous with the inner side of the front wall 12A in vicinities of the left sides of the inclined wall portions 30.

A pair of upper and lower inclined wall portions 34, which are shaped, in plan view, so as to substantially follow along the outer peripheral surface of the door 50, are provided at the inner side of the front end portion of a right wall 12B of the case 12. (The right wall 12B is the portions of the peripheral walls 16A, 18A where the outer surfaces thereof face in the direction of arrow B.) The front end surfaces of the inclined wall portions 34 prescribe the rear edge of the opening 20. A pair of upper and lower screw bosses 36 are provided at the front end portions of the inclined wall portions 34.

A slit 40, which is of a predetermined length and serves as a window portion which communicates the interior and the exterior of the case 12, is formed in the right wall 12B of the case 12. The slit 40 is for exposing an operation projection 52 of the door 50 which will be described later. The slit 40 is formed by cutting-out the lower portion of the front side of the peripheral wall 16A of the upper case 16 which forms the right wall 12B, and the slit 40 opens toward the opening 20 as well. Forming the slit 40 in this way such that a portion of the peripheral wall 16A remains at the upper side is preferable in that the rigidity of the case 12 can be maintained. In particular, it is more preferable that the upper side wall prescribing the slit 40 be integral and continuous with the inclined wall portion 34.

A concave portion 48 is formed at the rear side of the lower case 18. The portion of the concave portion 48, other than the upper end of the peripheral wall 18A, is recessed toward the inner side of the case 12 in a substantially U-shaped configuration as seen in cross-sectional view, and is recessed upwardly from the bottom surface of the case 12 as well (the floor plate is cut-out). The concave portion 48 is formed at the left wall of the case 12 as well. The concave portions 48 are engagement portions which, for example, a pull-in means of a drive device engages. The floor surfaces (the downwardly-facing surfaces) of the concave portions 48 serve as reference surfaces for positioning within a drive device.

Concave portions 46 are formed at the rear sides of the concave portions 48. The portion of the concave portion 46, other than the upper end of the peripheral wall 18A, is recessed toward the inner side of the case 12 in a substantially U-shaped configuration as seen in cross-sectional view, and is recessed upwardly from the bottom surface of the case 12 as well (the floor plate is cut-out). The concave portions 46 are engagement portions which a grasping means of a library device engages. By providing the concave portions 46, 48, the torsional strength of the case 12 (the lower case 18) is improved. Moreover, a concave portion 44, which is substantially trapezoidal as seen in plan view, is formed in the top surface portion of the left wall of the upper case 16. This concave portion 44 is an engagement portion which is engaged by a holding member (not shown) for canceling the rotational moment accompanying the movement of the door 50 in the direction of opening at the time of opening the opening 20.

Guide wall portions 42, which are predetermined heights (e.g., about 1.0 mm to 1.5 mm) and which support convex portions 51 of the door 50 (which will be described later) such that the convex portions 51 are nipped from both the inner surface side and the outer surface side, stand erect at the upper case 16 and the lower case 18 from a vicinity of the opening 20 to a vicinity of the region where the play restricting walls 28 are closest to the right wall 12B (hereinafter, these portions will be called the front half guide wall portions 42), and from a vicinity of the rear end of the slit 40 to a vicinity of the rear wall (hereinafter, these portions will be called the rear half guide wall portions 42).

The guide wall portions 42 are formed in substantial arc-shapes as seen in plan view, and have different lengths at the upper case 16 and the lower case 18. The guide wall portion 42 at the upper case 16 is formed such that the rear half side thereof is longer than that of the guide wall portion 42 at the lower case 18. This is because the memory board M is disposed so as to be inclined at a predetermined angle at the right wall 12B side of the rear portion inner wall 18B of the lower case 18.

Further, the rear end portions of the guide wall portions 42 are closed in substantial arc-shapes as seen in plan view, and restrict the convex portions 51 which are furthest toward the rear at both the top and bottom of the door 50 such that the door 50 cannot move any further rearward. The front end portions of the guide wall portions 42 extend to positions which, when the leader pin 22 is entering and exiting, do not impede the entry or exit of the leader pin 22 (in the illustrated structure, positions which are about half of the opening width of the opening 20 and which are further rearward than the pin holding portions 24).

Guide wall portions 41, whose rear end portions are open, stand erect in vicinities of the inclined wall portions 30 so as to be positioned on imaginary lines extending from the guide wall portions 42. The rear end portions of the guide wall portions 41 do not extend further rearward than the front ends of the pin holding portions 24, so as to not impede the entry and exit of the leader pin 22. The interval (groove width) of the guide wall portion 41 is formed so as to be slightly more narrow than the interval (groove width) of the guide wall portion 42.

Namely, the interval (groove width) of the guide wall portion 42 is slightly wider so as to permit dispersion in molding of the door 50 (dispersion in the curvature). The convex portions 51 of the door 50 slide within the guide wall portions 42 in a state in which there is a certain amount of joggling. Accordingly, the interval (groove width) of at least the guide wall portion 41 is substantially the same size as the width of the convex portion 51 of the door 50 (the width including projections which will be described later). Due to the front most convex portions 51 being fit into the guide wall portions 41 when the opening 20 is closed, the door 50 can be held without joggling.

The guide wall portions 41 and the front half guide wall portions 42 are formed so as to be slightly lower than the rear half guide wall portions 42. Namely, for example, the heights of the guide wall portions 41 and the front half guide wall portions 42 are formed to be about 1 mm, whereas the heights of the rear half guide wall portions 42 are formed to be about 1.5 mm. This is in order to ensure, at the opening 20, space for entry of the pullout means of a drive device which engages and pulls-out the leader pin 22. Accordingly, as will be described later, the plate width (height) of the front half portion of the door 50 (at least the portion thereof which closes the opening 20) is formed to be larger (higher) by an amount corresponding to the amount by which the guide wall portions 41 and the front half guide wall portions 42 are made lower.

Further, ribs 38, which are substantially trapezoidal in plan view and which are integral with the guide wall portions 42 at the outer sides which are exposed from the opening 20, stand erect at the inner surface of the upper case 16 and the inner surface of the lower case 18 so as to be the same heights as these guide wall portions 42. The strength of the upper case 16 and the lower case 18 at the opening 20 portion is ensured by these ribs 38. The guide wall portions 42 at the inner side are integral and continuous with the pin holding portions 24. It is preferable that the heights of the pin holding portions 24 are formed to be substantially the same as or greater than the heights of the guide wall portions 42 with which they are integral and continuous.

The upper case 16 and the lower case 18 which were described above are fixed (joined) together by unillustrated screws being screwed, from beneath, into the screw bosses 32, 36 which are positioned in the vicinities of the edge portions of the opening 20. In this way, the corner portions at both ends of the opening 20, which are prescribed by the free ends of the inclined wall portions 30 (the front wall 12A) and the inclined wall portions 34 (the right wall 12B) and which are disadvantageous in terms of strength and which easily hit the ground or the like when the case 12 is dropped, are joined together strongly. Even if the case 12 is dropped, it is difficult for the case 12 to deform or buckle, or for positional offset to arise thereat, due to the entire weight of the recording tape cartridge 10. Note that the abutting surfaces of the peripheral walls 16A, 18A (the corner portions at both sides of the opening 20) may be fixed together by welding. However, fixing together by screws is preferable in consideration of the ability to disassemble and the ability to recycle the case 12.

The opening 20 is opened and closed by the door 50 which serves as a shielding member. The plate width (height) of the portion of the door 50 which slides in the guide wall portions 41 and the front half guide wall portions 42 (i.e., at least the portion of the door 50 which closes the opening 20) is formed to be substantially the same as the opening height of the opening 20. The portion at the rear side thereof is formed to be slightly smaller (lower). The plate length of the door 50 is formed to be sufficiently larger than the opening width of the opening 20. The door 50 is formed in a substantial arc-shape as seen in plan view which curves along the direction of plate thickness, such that the door 50 can move along a predetermined circumference.

The curved longitudinal dimension of the door 50 is determined such that, in the state in which the door 50 closes the opening 20, the rear end portion of the door 50 is positioned in the right rear corner portion of the case 12, which is further toward the rear than the concave portion 48 (i.e., the right rear corner portion in a vicinity of the concave portion 46). The bottom rear portion of the door 50 is cut obliquely in order to avoid the memory board M which is disposed so as to be inclined at a predetermined angle at the rear portion inner wall 18B of the lower case 18. Note that the inner surface and/or the outer surface at the distal end portion (front end portion) of the door 50 is preferably formed as a tapered surface so as to smoothly enter into the guide wall portions 41.

The convex portions 51 project from the top surface and the bottom surface of the door 50. The convex portions 51 abut the guide surfaces of the guide wall portions 41 and the guide wall portions 42 (the inner surfaces which oppose each other) and the inner surface of the upper case 16 and the inner surface of the lower case 18 between the guide wall portions 41 and the guide wall portions 42, and guide the door 50 in the directions of opening and closing the opening 20. The convex portions 51 are formed in substantially oval shapes as seen in plan view which are long along the longitudinal direction of the door 50. Four convex portions 51 project at each of the top surface and the bottom surface of the door 50 so as to have top/bottom symmetry (except for the convex portions 51 furthest toward the rear), and so as to project to substantially the same heights as the heights of the guide wall portions 41 and the guide wall portions 42 (for example, about 0.5 mm at the front side of a border portion where the plate width of the door 50 changes, and about 1.5 mm at the rear side of this border portion). Note that the convex portions 51 furthest toward the rear do not have top/bottom symmetry because the bottom rear portion of the door 50 is cut obliquely.

The distal end of the convex portion 51 is formed in a substantial arc-shape as seen in sectional view (side view). Projections (not illustrated), which are substantially arc-shaped in plan view or are substantially triangular in plan view or the like, project along the entire height of the convex portion 51 at the both side surfaces of the convex portion 51. Accordingly, when the convex portions 51 are inserted between the guide wall portions 42 and slide, only the substantially arc-shaped distal ends of the convex portions 51 contact the inner surface of the upper case 16 and the inner surface of the lower case 18 such that linear contact arises thereat, and only the substantially arc-shaped (or the like) distal ends of the projections contact the mutually opposing guide surfaces of the guide wall portions 42 such that linear contact similarly arises thereat.

Thus, the sliding resistance (friction) between, on the one hand, the top and bottom convex portions 51, and, on the other hand, the inner surface of the upper case 16 and the inner surface of the lower case 18 between the guide wall portions 41 and the guide wall portions 42 and the guide surfaces of the guide wall portions 41 and the guide wall portions 42, can be reduced, and the door 50 can be slid smoothly with little resistance. Note that, when the convex portions 51 are formed in substantially oval shapes as seen in plan view, the impact resistance thereof is better than if, for example, the convex portions 51 were to be formed in substantially circular shapes as seen in plan view. Thus, even if force is applied to the door 50 from a direction other than the opening/closing directions due to the impact of a drop or the like, there is no fear that the convex portions 51 will break.

An operation projection 52 serving as an operation portion projects along the radial direction of the door 50 from the outer peripheral surface of the door 50 at a region which is slightly further forward than the longitudinal direction central portion of the door 50 (i.e., at a vicinity of the border portion where the plate width of the door 50 changes). The operation projection 52 is exposed to the exterior of the case 12 from the slit 40. In the state in which the opening 20 is closed, the operation projection 52 is positioned so as to be slightly set apart from the rear end of the screw boss 36, and can be operated from the portion of the slit 40 which opens toward the front. Further, in the state in which the opening 20 is open, the operation projection 52 is positioned so as to be slightly set apart from the rear edge of the slit 40. At this time, the rear most convex portions 51 abut the rear end portions of the guide wall portions 42.

Although the interior and the exterior of the case 12 communicate via the slit 40 for exposing the operation projection 52, adhesion of dust and the like to the magnetic tape T wound on the reel 14 is prevented by the play restricting walls 28 serving as inner walls, and due to the fact that the slit 40 is always substantially closed by the screw boss 36 and by the door 50 which extends over substantially the entire height in the case 12.

Further, stoppers 58, which abut the upper end portion side surface and the lower end portion side surface of the leader pin 22 when the opening 20 is closed, project at the inner surface of the front end portion of the door 50. The stoppers 58 can even further prevent the leader pin 22 from falling out from the pin holding portions 24 due to impact of a drop or the like. Further, a coil spring 56, which serves as an urging member which urges the door 50 in the direction of closing the opening 20, has a length such that it extends to the rear right corner portion of the case 12 in the state in which the door 50 closes the opening 20. Thus, the space between the play restricting walls 28 and the right wall 12B (the peripheral walls 16A, 18A) at the rear right corner portion can be utilized effectively.

Namely, a spring holding portion 54, which is substantially L-shaped in rear view, projects integrally at the inner peripheral surface of the door 50 in the vicinity of the rear end thereof, so as to be directed upwardly. A solid cylindrical spring anchor portion 55 projects upwardly at the inner surface of the lower case 18 in a vicinity of the concave portion 48. Ring-shaped attachment portions 56A, 56B are formed at the both ends of the coil spring 56 (see FIG. 2). Accordingly, the one attachment portion 56B of the coil spring 56 is placed on the spring anchor portion 55 from above such that the spring anchor portion 55 is inserted through the attachment portion 56B, and the other attachment portion 56A is placed on the spring holding portion 54 from above such that the spring holding portion 54 is inserted through the attachment portion 56A. The coil spring 56 can thereby be attached simply within the aforementioned space.

A rib 57, which the top end of the spring holding portion 54 slidingly contacts at the time when the door 50 is opening and closing, stands erect in a substantial arc-shape in plan view at the upper case 16 (see FIGS. 2 and 4). The rib 57 is disposed at a position and has a length such that the top end of the spring holding portion 54 can slidingly contact the rib 57 at least when the door 50 starts to move (open). Due to the rib 57 suitably guiding the spring holding portion 54 which moves against the urging force of the coil spring 56, the door 50 can be opened more stably (i.e., at the time of opening, the door 50 does not shake due to the urging force of the coil spring 56).

Further, by providing the rib 57, even if the attachment portion 56A of the coil spring 56 rises up along the spring holding portion 54 due to an impact caused by a drop or the like being applied to the case 12, the attachment portion 56A does not come off of the spring holding portion 54. Note that the top end of the spring anchor portion 55 is inserted between the play restricting wall 28 and the guide wall portion 42 of the upper case 16. Thus, in the same way, the attachment portion 56B can be prevented from coming off of the spring anchor portion 55.

Figure 5:
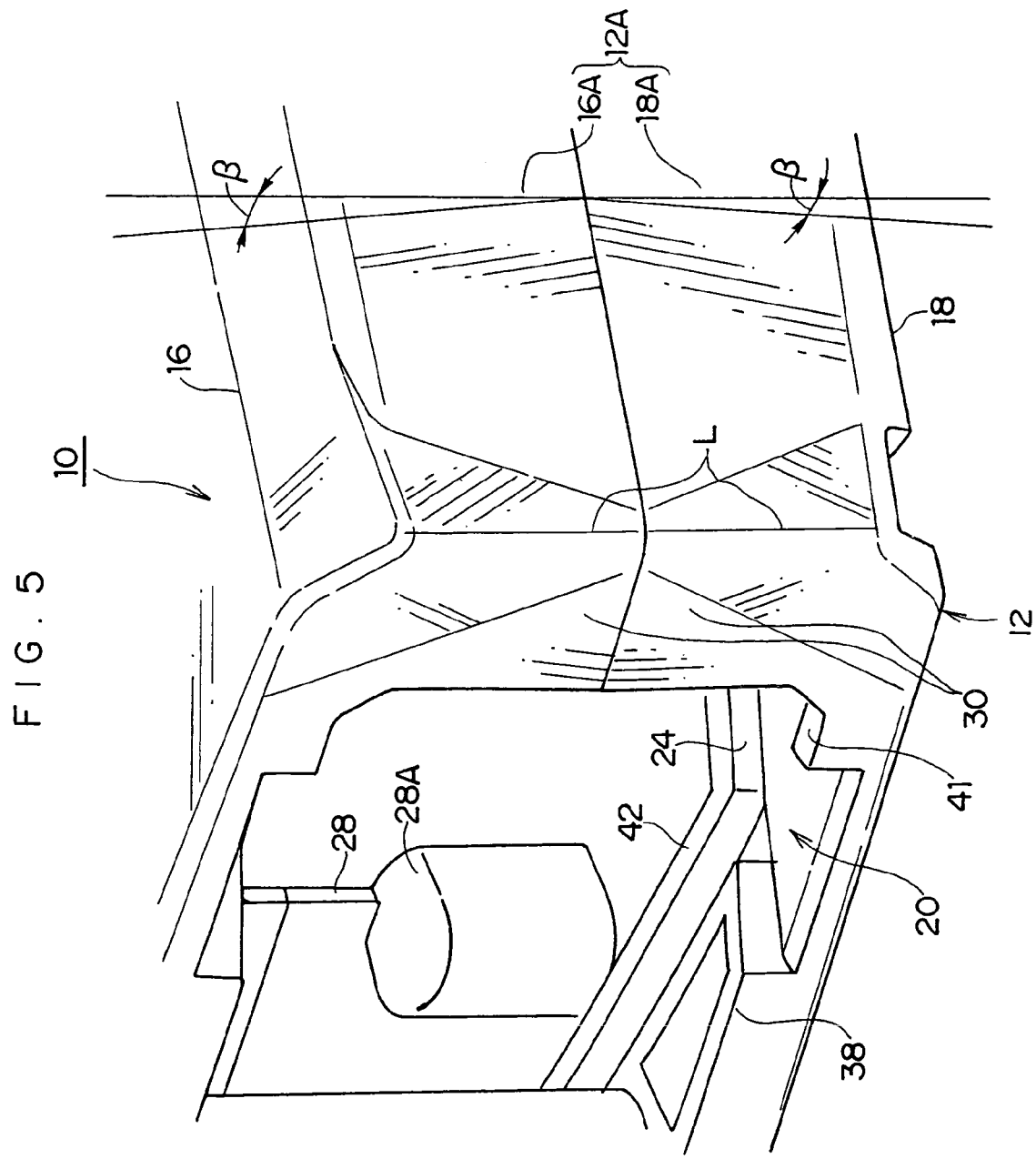
FIG. 5 is a schematic perspective view of a ridge line portion.
Figure 6:
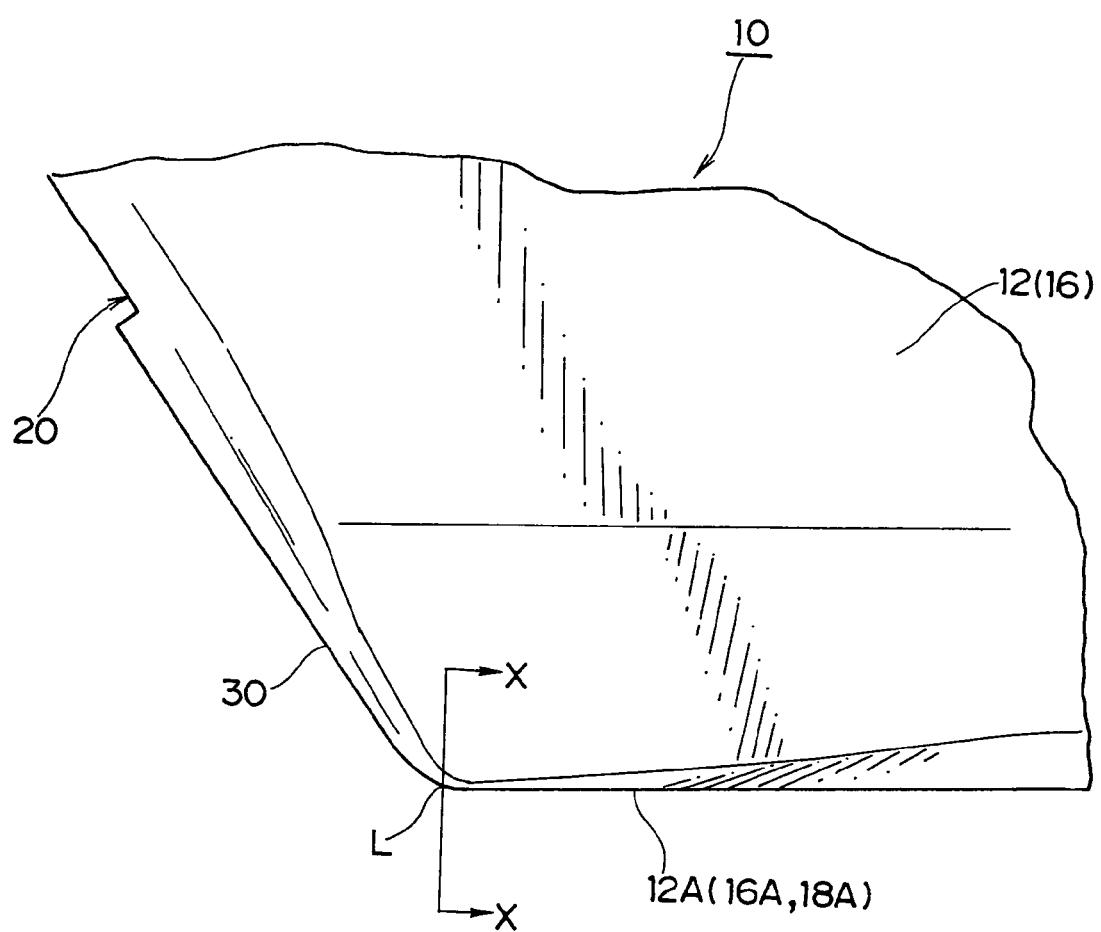
FIG. 6 is a schematic plan view of the ridge line portion.

Here, as described above, the upper case 16 and the lower case 18 are formed of a synthetic resin, and the case 12 is assembled by joining the upper case 16 and the lower case 18 together with the peripheral wall 16A of the upper case 16 and the peripheral wall 18A of the lower case 18 opposing one another. Drafts for facilitating removal from molds for molding are formed at the peripheral walls 16A, 18A. As shown in FIG. 5, the draft is an angle of inclination β with respect to the vertical direction of the peripheral walls 16A, 18A as seen in side view, and extends from the ceiling plate of the upper case 16 over the peripheral wall 16A, and from the floor plate of the lower case 18 over the peripheral wall 18A. In the recording tape cartridge 10 whose height is 30 mm or less, the draft is usually formed such that β=1° to 2°.

Figure 7:
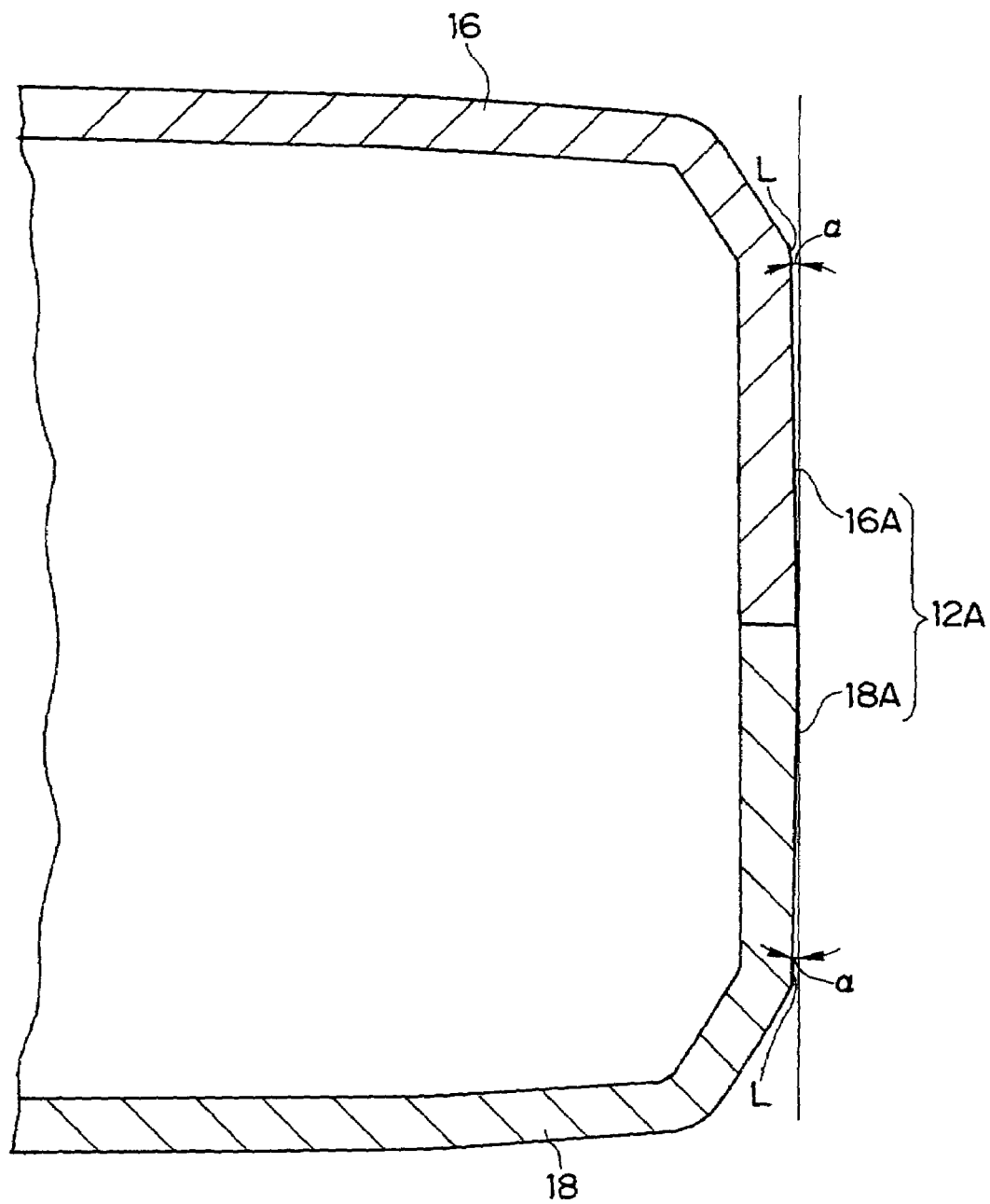
FIG. 7 is a schematic side sectional view as seen in the direction of the arrows of line X—X of FIG. 6.
Figure 8:
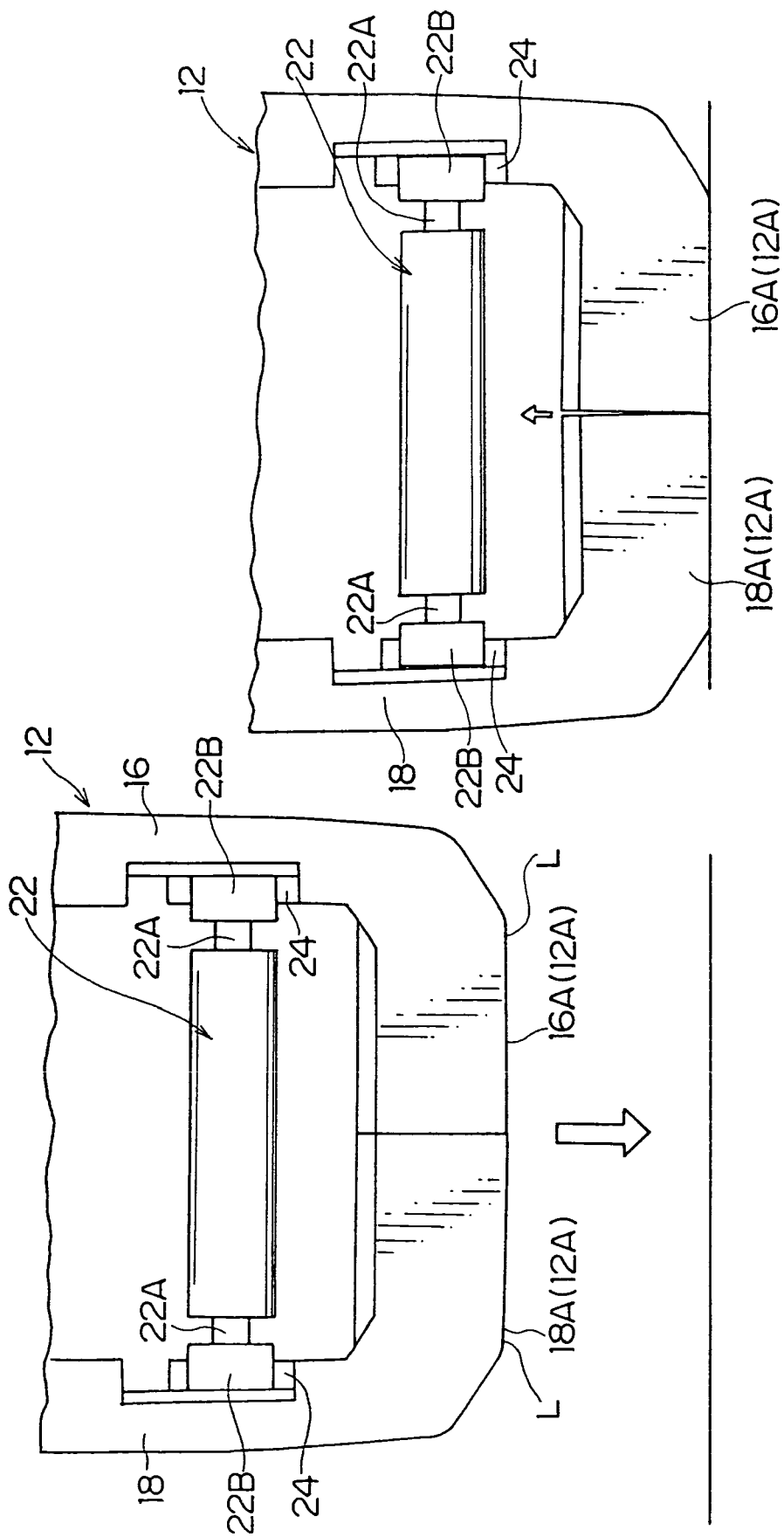
FIGS. 8A and 8B are explanatory diagrams showing the state at the time when a case is dropped and the ridge line portion hits the ground.
Figure 9:
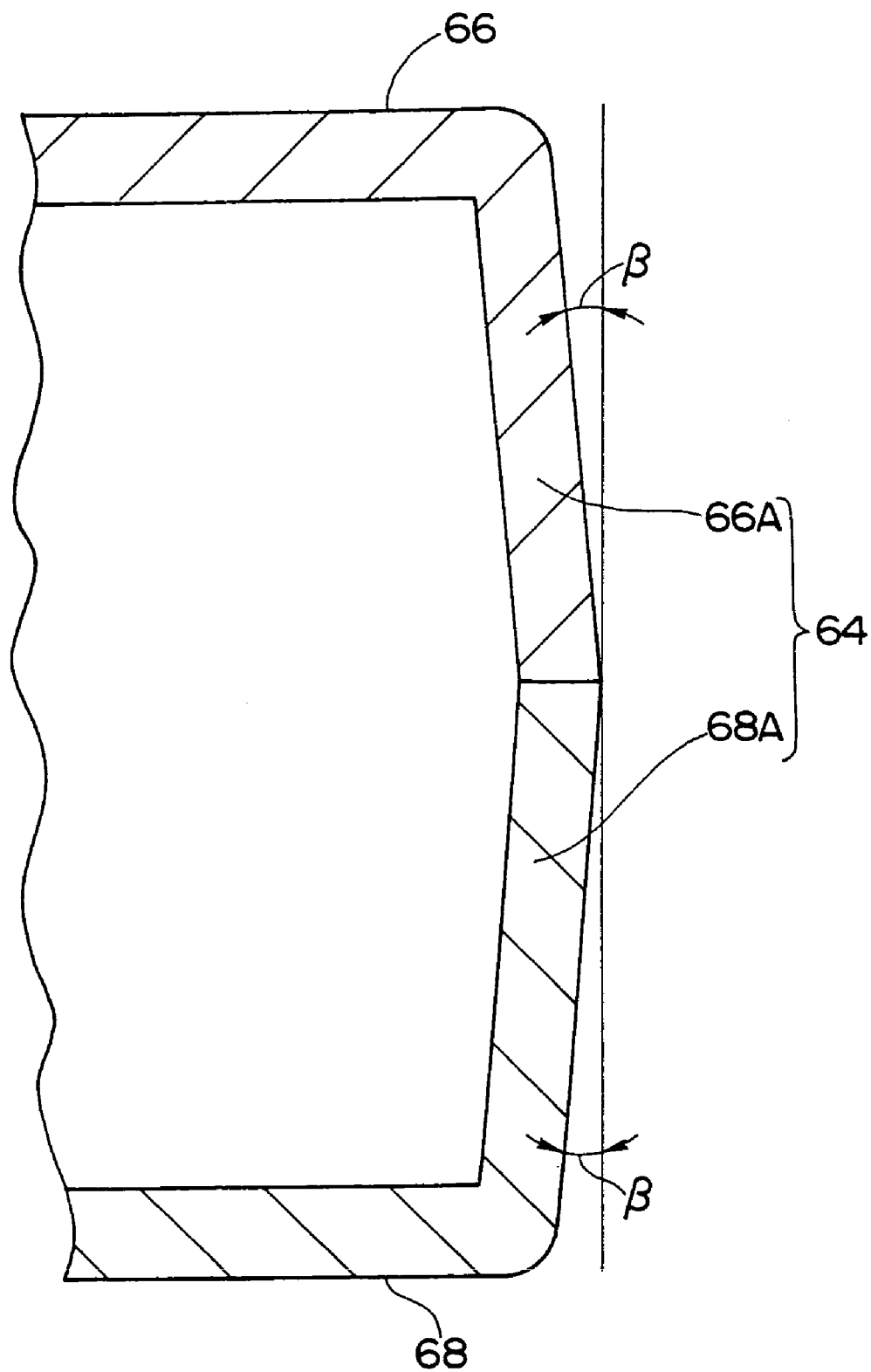
FIG. 9 is a schematic side sectional view of a front wall of a conventional case.
Figure 10A:
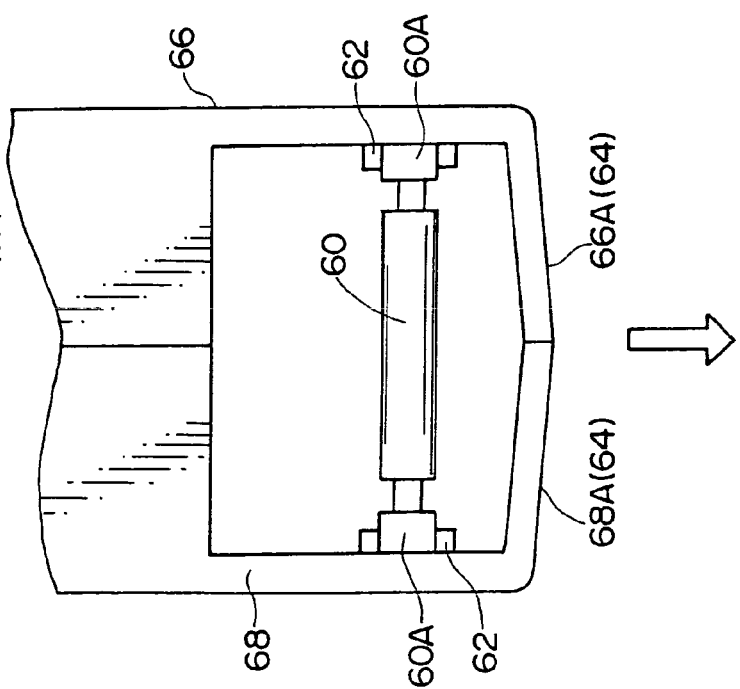
FIGS. 10A and 10B are explanatory diagrams showing the state at the time when the conventional case is dropped and a front wall side thereof hits the ground.
Figure 10B:
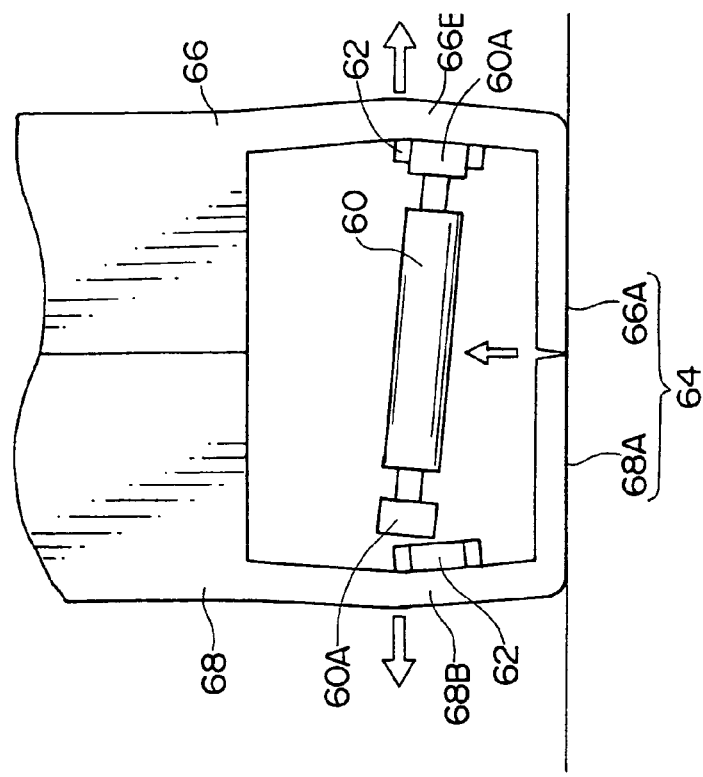

Further, as described above, the case 12 is formed in a configuration which is such that a corner portion at the side of loading the case 12 into a drive device (the front right corner portion) is cut-off obliquely at a predetermined angle as seen in plan view. The inclined wall portions 30, which run along this predetermined angle, are continuous with the front wall 12A. Moreover, as shown in FIGS. 5 through 8B, ridge lines L in the vertical direction are formed at the border portion between the front wall 12A and the inclined wall portions 30. The screw bosses 32 are provided at the inner sides thereof. As shown in FIG. 7, a draft α of at least the outer wall of the ridge line L portion is formed, at both of the peripheral walls 16A, 18A, such that α=1° or less (preferably, α=0°). The draft α is an angle of inclination which is smaller than the drafts β of the front wall 12A and the inclined wall portions 30 at the both sides of the ridge lines L.

Accordingly, the amount of flexural deformation toward the inner side of the case when the case 12 is dropped and the ridge line L portion hits the ground is markedly reduced. Namely, this ridge line L portion is a portion which, due to formation of the opening 20, is near the free end, and at which there is the highest possibility that falling-out or positional offset of the leader pin 22 will be caused by the impact of a drop or the like. The inner sides of the ridge line L portions are joined together by screws. In the case of the large draft β, if the ridge line L portion were to receive the impact of a drop, there would be the concern that the ceiling plate of the upper case 16 and the floor plate of the lower case 18 forming the opening 20 would respectively flexurally deform greatly toward the outer sides.

Accordingly, the draft α at this ridge line L portion is set to be α=1° or less, and preferably α=0°. In accordance with such a structure, as shown in FIGS. 8A and 8B, even if the ridge line L portion of the case 12 receives impact due to a drop or the like, the amount of flexural deformation of the ridge line L portion toward the inner side of the case 12 can be greatly reduced. Therefore, accompanying this reduction, the amount of flexural deformation of the ceiling plate of the upper case 16 and the floor plate of the lower case 18 toward the respective outer sides can be greatly reduced. Accordingly, the leader pin 22 does not fall out from the pin holding portions 24, and the position of the leader pin 22 with respect to the pin holding portions 24 does not become offset.

Note that it is preferable that the position at which the pin holding portions 24 are disposed be in a vicinity of the screw bosses 32 or in a vicinity of the screw bosses 36. In the present embodiment, the pin holding portions 24 are disposed in a vicinity of the screw bosses 32. When the pin holding portions 24 are disposed at such a position, even if vibrations arise at the ceiling plate of the upper case 16 or the floor plate of the lower case 18 due to dropping of the case 12 or the like, it is difficult for the pin holding portions 24 to be affected by such vibrations. Accordingly, it is possible to even further prevent the position of the leader pin 22 from becoming offset and the leader pin 22 from falling out.

Next, operation of the present embodiment will be described. When the recording tape cartridge 10 having the above-described structure is not being used (i.e., is being stored, is being transported, or the like), the opening 20 is closed by the door 50. Specifically, due to the urging force of the coil spring 56, the door 50 is always urged in the direction of closing the opening 20, and closes the opening 20 in a state in which the distal end portion (the front end portion) of the door 50 has entered in the guide wall portions 41 which are in a vicinity of the inclined wall portions 30.

On the other hand, when the magnetic tape T is to be used, the recording tape cartridge 10 is loaded into a drive device along the direction of arrow A. Accompanying this loading, an opening/closing member (not illustrated) forming an opening/closing means of the drive device enters into the slit 40 which opens toward the front, and engages with the operation projection 52 of the door 50. In this state, when the recording tape cartridge 10 (the case 12) is pushed in further, due to the pushing-in force, the opening/closing member moves the operation projection 52 rearward against the urging force of the coil spring 56 (i.e., moves the operation projection 52 rearward relative to the case 12 which is loaded in the direction of arrow A).

Then, while the convex portions 51 are guided by the guide wall portions 42 and the spring holding portion 54 is guided by the rib 57, the door 50, from which the operation projection 52 projects, rotates clockwise as seen in plan view along the direction of curving thereof. Namely, due to the guide wall portions 42, the door 50 moves substantially rearward so as to circle around the outer sides of the pin holding portions 24 and the reel 14 without jutting out from the locus of movement along the curved configuration of the door 50, and opens the opening 20. Then, when the case 12 (the recording tape cartridge 10) is loaded to a predetermined depth in the drive device, the opening 20 is completely opened.

When the recording tape cartridge 10 is positioned within the drive device in this state in which the opening 20 is opened, further rotation (substantially rearward movement) of the door 50 is restricted. The pull-out means of the drive device enters into the case 12 from the opening 20 which has been opened. The pull-out means pulls-out the leader pin 22 which is positioned and held at the pin holding portions 24. At this time, the distal ends of the anchor spring 25 elastically deform appropriately, such that pulling-out of the leader pin 22 from the pin holding portions 24 is permitted. Then, the leader pin 22 is accommodated at a take-up reel (not shown), and the take-up reel and the reel 14 are driven to rotate synchronously. Thus, the magnetic tape T is successively pulled-out from the case 12 while being taken-up onto the take-up reel. Information is recorded or played back by a recording/playback head or the like disposed along a predetermined tape path.

On the other hand, when the magnetic tape T is rewound onto the reel 14 and the leader pin 22 is to be held at the pin holding portions 24, the distal ends of the anchor spring 25 elastically deform appropriately such that entry of the leader pin 22 into the pin holding portions 24 is permitted. When the recording tape cartridge 10 is to be ejected from the drive device, the positioned state of the recording tape cartridge 10 is cancelled, and the recording tape cartridge 10 is moved in the direction opposite to the direction of arrow A by the urging force of the coil spring 56 or by an unillustrated ejecting mechanism. In this way, the door 50 is rotated in the direction of closing the opening 20 by the urging force of the coil spring 56, while the convex portions 51 are guided by the guide wall portions 42. Due to the distal end portion (the front end portion) of the door 50 entering into the guide wall portions 41, the opening 20 is completely closed and returned to its initial state.

Here, as shown in FIG. 7, the draft $\alpha$ at the ridge line L portion is formed to be $\alpha = 1°$ or less (and preferably $\alpha = 0°$). Thus, even if impact is applied to this ridge line L portion due to the recording tape cartridge 10 being dropped or the like, the amount of flexural deformation of the upper case 16 and the lower case 18 due to the impact of the drop can be markedly reduced (suppressed). Namely, although the ridge line L portion is the portion where there is the highest possibility that falling-out or positional offset of the leader pin 22 will be caused due to the impact of a drop or the like, the ridge line L portion has excellent impact resistance with respect to drops therefrom, and the amount of flexural deformation in the vicinity of the pin holding portions 24 can be markedly decreased. It is possible to prevent the leader pin 22 from falling out from the pin holding portions 24, and positional offset of the leader pin 22 with respect to the pin holding portions 24. Accordingly, it is possible to ensure the accuracy of the pin holding portions 24, which is the position at which the leader pin 22 is held (positioned) which is most important in the functioning of the recording tape cartridge 10 (in order for the leader pin 22 to be correctly anchored by the pull-out means of the drive device at the time of pulling out the magnetic tape T).

As described above, in accordance with the present invention, even if impact is applied to the case in the vicinity of the opening due to a drop or the like, the amount of flexural deformation due to the impact can be markedly reduced because the draft of the ridge line portion of the case in the vicinity of the opening is formed to be 1° or less. Accordingly, accompanying this reduction, the amounts of flexural deformation of the ceiling plate of the case and the floor plate of the case, which flexurally deform toward the respective outer sides, can also be markedly reduced. Thus, the leader pin does not fall out from the pin holding portions, and the position of the leader pin with respect to the pin holding portions does not become offset.

What is claimed is:

1. A tape cartridge which can be inserted into a tape drive having an opening member which can operatively engage with the tape cartridge at a time when the tape cartridge is inserted, the tape cartridge comprising:

a case which is hollow, and which is formed of a synthetic resin, and which has an upper case and a lower case each formed from a base plate and a peripheral wall, and which is formed by the peripheral walls abutting one another, the case having a front wall portion facing in a cartridge insertion direction, a side wall portion substantially parallel to the cartridge insertion direction, and an inclined wall portion connecting the front wall portion and the side wall portion and inclined with respect to the cartridge insertion direction;

a tape access opening provided at the inclined wall portion of the case; and a ridge line portion extending in a vertical direction and formed at an intersection of the front wall portion of the case and the inclined wall portion of the case, wherein a draft of the ridge line portion at the upper case and a draft of the ridge line portion at the lower case are both smaller than a draft of the front wall portion and a draft of the inclined wall portion at the sides of the ridge line portion.

2. The tape cartridge of claim 1, further comprising:

a reel which is accommodated in the case, and on which a tape is wound so as to be able to be freely drawn out; and a leader pin attached to a free end of the tape.

3. The tape cartridge of claim 2, further comprising a pin holding structure for releasably holding the leader pin at a predetermined holding position within the case, such that the leader pin spans between the upper case and the lower case.

4. The tape cartridge of claim 3, wherein the holding position is in a vicinity of the tape access opening with the case.

5. The tape cartridge of claim 3, wherein the pin holding structure has an elastic member which has a free end portion and a proximal portion, and which is for pushing the leader pin by the free end portion and positioning the leader pin at the holding position.

6. The tape cartridge of claim 1, wherein the case is substantially rectangular in plan view.

7. The tape cartridge of claim 1, wherein a plurality of joining portions for joining the upper case and the lower case are provided at the case.

8. The tape cartridge of claim 1, wherein the draft of the front wall portion and the draft of the inclined wall portion are both in a range of 1° to 2°.

9. A tape cartridge which can be inserted into a tape drive having an opening member which can operatively engage with the tape cartridge at a time when the tape cartridge is inserted, the tape cartridge comprising:

a case which is hollow, and which is formed of a synthetic resin, and which has an upper case and a lower case each formed from a base plate and a peripheral wall, and which is formed by the peripheral walls abutting one another, the case having a front wall portion facing in a cartridge insertion direction, a side wall portion substantially parallel to the cartridge insertion direction, and an inclined wall portion connecting the front wall portion and the side wall portion and inclined with respect to the cartridge insertion direction;

a tape access opening provided at the inclined wall portion of the case;

a ridge line portion extending in a vertical direction and formed at an intersection of the front wall portion of the case and the inclined wall portion of the case; and a shielding member which can move reciprocatingly along an arc-shaped path of movement between a closing position for closing the tape access opening and an opening position for opening the tape access opening, wherein a draft of the ridge line portion at the upper case and a draft of the ridge line portion at the lower case are both 1° or less.

10. The tape cartridge of claim 9, further comprising an urging element which always urges the shielding member toward the closing position.

11. The tape cartridge of claim 9, further comprising an operation portion provided at the shielding member, and due to the tape cartridge being inserted, the operation portion can move the shielding member toward the opening position while engaging with the opening member of the tape drive.

12. A tape drive into which a tape cartridge can be inserted, and which carries out at least one of reading of data and writing of data, the tape cartridge having:

a case which is hollow, and which is formed of a synthetic resin, and which has an upper case and a lower case each formed from a base plate and a peripheral wall, and which is formed by the peripheral walls abutting one another, the case having a front wall portion facing in a cartridge insertion direction, a side wall portion substantially parallel to the cartridge insertion direction, and an inclined wall portion connecting the front wall portion and the side wall portion and inclined with respect to the cartridge insertion direction;

a tape access opening provided at the inclined wall portion of the case; and a ridge line portion extending in a vertical direction and formed at an intersection of the front wall portion of the case and the inclined wall portion of the case, wherein a draft of the ridge line portion at the upper case and a draft of the ridge line portion at the lower case are both smaller than a draft of the front wall portion and a draft of the inclined wall portion at the sides of the ridge line portion, and the tape drive has an opening member which can operatively engage with the tape cartridge at a time when the tape cartridge is inserted.

13. The tape drive of claim 12, wherein the opening member extends in a direction traversing the tape cartridge insertion direction.

14. The tape drive of claim 12, wherein the draft of the front wall portion and the draft of the inclined wall portion are both in a range of 1° to 2°.

15. A tape drive into which a tape cartridge can be inserted, and which carries out at least one of reading of data and writing of data, the tape cartridge having:

a case which is hollow, and which is formed of a synthetic resin, and which has an upper case and a lower case each formed from a base plate and a peripheral wall, and which is formed by the peripheral walls abutting one another, the case having a front wall portion facing in a cartridge insertion direction, a side wall portion substantially parallel to the cartridge insertion direction, and an inclined wall portion connecting the front wall portion and the side wall portion and inclined with respect to the cartridge insertion direction;

a tape access opening provided at the inclined wall portion of the case; and a ridge line portion extending in a vertical direction and formed at an intersection of the front wall portion of the case and the inclined wall portion of the case, wherein a draft of the ridge line portion at the upper case and a draft of the ridge line portion at the lower case are both 1° or less, and the tape drive has an opening member which can operatively engage with the tape cartridge at a time when the tape cartridge is inserted, wherein the tape cartridge has a shielding member which can move reciprocatingly along an arc-shaped path of movement between a closing position for closing the tape access opening and an opening position for opening the tape access opening, and at the time when the tape cartridge is inserted, the opening member engages with the shielding member and can move the shielding member toward the opening position.

16. A tape drive into which a tape cartridge can be inserted, and which carries out at least one of reading of data and writing of data, the tape cartridge having:

a case which is hollow, and which is formed of a synthetic resin, and which has an upper case and a lower case each formed from a base plate and a peripheral wall, and which is formed by the peripheral walls abutting one another, the case having a front wall portion facing in a cartridge insertion direction, a side wall portion substantially parallel to the cartridge insertion direction, and an inclined wall portion connecting the front wall portion and the side wall portion and inclined with respect to the cartridge insertion direction;

a tape access opening provided at the inclined wall portion of the case; and a ridge line portion extending in a vertical direction and formed at an intersection of the front wall portion of the case and the inclined wall portion of the case, wherein a draft of the ridge line portion at the upper case and a draft of the ridge line portion at the lower case are both less than one degree, the tape drive has an opening member which can operatively engage with the tape cartridge at a time when the tape cartridge is inserted, and wherein the opening member enters into the case at the time when the tape cartridge is inserted.

17. The tape drive of claim 16, wherein the opening member enters into a slit provided at the case.

* * * * *